(12) United States Patent
Park et al.

(10) Patent No.: US 11,573,114 B2
(45) Date of Patent: Feb. 7, 2023

(54) ROBOT AND METHOD FOR CALCULATING LEVEL OF LIQUID IN THE LIQUID CONTAINER

(71) Applicant: LG ELECTRONICS INC., Seoul (KR)

(72) Inventors: Sung Gil Park, Seoul (KR); Changwoo Son, Seoul (KR); Seyul Son, Seoul (KR); Taeyoung Choi, Seoul (KR); Seukwoo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 609 days.

(21) Appl. No.: 16/735,071

(22) Filed: Jan. 6, 2020

(65) Prior Publication Data

US 2021/0080308 A1    Mar. 18, 2021

(30) Foreign Application Priority Data

Sep. 18, 2019    (KR) .................. 10-2019-0114621

(51) Int. Cl.
| | |
|---|---|
| *B25J 9/16* | (2006.01) |
| *G01F 23/22* | (2006.01) |
| *B25J 15/00* | (2006.01) |
| *G06N 3/08* | (2006.01) |
| *G01F 23/00* | (2022.01) |

(52) U.S. Cl.
CPC .............. *G01F 23/22* (2013.01); *B25J 9/163* (2013.01); *B25J 9/1679* (2013.01); *B25J 15/0019* (2013.01); *G01F 23/0038* (2013.01); *G06N 3/08* (2013.01)

(58) Field of Classification Search
USPC ................................... 700/245–264
See application file for complete search history.

(56) References Cited

U.S. PATENT DOCUMENTS

| | | | | |
|---|---|---|---|---|
| 5,133,392 A | * | 7/1992 | Hamann | B01L 3/0262 422/930 |
| 5,943,476 A | * | 8/1999 | Dougherty | B25J 9/1694 700/251 |
| 10,429,401 B2 | * | 10/2019 | Streibl | G01N 33/49 |
| 11,386,551 B2 | * | 7/2022 | Drechsler | G06T 7/0012 |
| 2004/0118676 A1 | * | 6/2004 | Mizohata | H01L 21/2885 205/291 |
| 2006/0259195 A1 | * | 11/2006 | Eliuk | B01F 33/8442 700/245 |

(Continued)

FOREIGN PATENT DOCUMENTS

GB    1598770 A * 9/1981    ......... G01F 23/0023

*Primary Examiner* — Jonathan L Sample
(74) *Attorney, Agent, or Firm* — Birch, Stewart, Kolasch & Birch, LLP (57) ABSTRACT

Provided are a robot that calculates a level of liquid contained in a liquid container and a method for calculating such liquid level. The robot includes a robot arm to which a tool is attached to an end of the robot arm, a torque sensor disposed on the robot arm and measuring a torque value of the robot arm, and a processor that controls the robot arm and receives the torque value from the torque sensor and calculates information related to the torque value, and calculates the level value of liquid contained in the liquid container based on the information related to the torque value.

20 Claims, 8 Drawing Sheets

(56) References Cited

U.S. PATENT DOCUMENTS

| | | | |
|---|---|---|---|
| 2007/0065945 A1* | 3/2007 | sIGRIST | G01N 35/1011 436/43 |
| 2007/0125442 A1* | 6/2007 | Tribble | A61J 3/002 141/27 |
| 2008/0247914 A1* | 10/2008 | Edens | G01N 35/1079 73/864.63 |
| 2010/0032593 A1* | 2/2010 | Yarbrough | G01F 23/292 250/577 |
| 2012/0321520 A1* | 12/2012 | Okanojo | G01N 21/6428 422/501 |
| 2013/0224851 A1* | 8/2013 | Ljungmann | B04B 5/0421 435/308.1 |
| 2013/0280143 A1* | 10/2013 | Zucchelli | G01N 35/026 422/501 |
| 2015/0160252 A1* | 6/2015 | Murakami | G01F 23/284 356/615 |
| 2016/0018427 A1* | 1/2016 | Streibl | G01F 23/2921 702/19 |
| 2016/0334429 A1* | 11/2016 | Abe | G01N 35/0099 |
| 2017/0023598 A1* | 1/2017 | Miyauchi | B25J 9/1682 |
| 2017/0066048 A1* | 3/2017 | Quinn | B22D 41/56 |
| 2017/0138976 A1* | 5/2017 | Pawlowski | G01N 35/1016 |
| 2017/0151934 A1* | 6/2017 | Almalki | B08B 1/008 |
| 2018/0238923 A1* | 8/2018 | Abe | B25J 9/1679 |
| 2019/0056718 A1* | 2/2019 | Satou | G06N 3/08 |
| 2019/0284612 A1* | 9/2019 | Buse | G01N 35/04 |
| 2020/0001258 A1* | 1/2020 | Knight | B01F 29/90 |

\* cited by examiner

ROBOT AND METHOD FOR CALCULATING LEVEL OF LIQUID IN THE LIQUID CONTAINER

CROSS-REFERENCE TO RELATED APPLICATION

This application claims priority to and the benefit of Korean Patent Application No. 10-2019-0114621, filed on Sep. 18, 2019, the disclosure of that is incorporated herein by reference in its entirety.

BACKGROUND

1. Field of the Invention

The present disclosure relates to a robot that calculates a level of liquid contained in a liquid container and a method for calculating the level of liquid contained in the liquid container.

2. Description of Related Art

Robots can automatically handle given work or can operate based on abilities of robots. In particular, the robots can recognize an environment and can determine states by themselves to perform operation of robots.

Meanwhile, the robot can perform work related to cooking at home or restaurants. For example, cooking robots can cut food materials, and can perform operation of putting broth in broth containers into bowls.

In particular, when a dish is prepared using broth, it is important to accurately check a level of broth contained in the broth. In the related art, users who use robots can visually check a water level of the broth or users can check water level sensors, thereby causing user inconvenience.

SUMMARY OF THE DISCLOSURE

The present disclosure provides a robot that calculates a level of liquid contained in a liquid container and a method for calculating the level of liquid contained in the liquid container.

The objects of the present disclosure are not limited to the above-mentioned objects, and other objects and advantages of the present disclosure which are not mentioned can be understood by the following description and more clearly understood by the embodiments of the present disclosure. It will also be readily apparent that the objects and advantages of the disclosure can be implemented by features described in claims and a combination thereof.

According to one embodiment of the present disclosure, a robot can include a robot arm to which a tool is attached at an end of the robot, a torque sensor disposed on the robot arm and measuring a torque value of the robot arm, and a processor that controls the robot arm and receives the torque value from the torque sensor and calculates information related to the torque value, and calculate a level value of liquid contained in a liquid container based on the information related to the torque value, and the processor controls the robot arm to move the tool inside of the liquid container, and the processor calculates the liquid level value based on first information related to a first torque value determined based on a lower end of the tool, which was moved, contacting a surface of the liquid and second information related to a second torque value determined based on the lower end of the tool, which was moved, contacting a bottom surface of the liquid.

Further, according to an embodiment of the present disclosure, a robot can include a robot arm in which a tool is attached to an end of the robot arm, a torque sensor disposed on the robot arm and measuring the torque value of the robot arm, a processor that controls the robot arm and receives the torque value from the torque sensor and generates the information related to the torque value, and calculates a level value of liquid contained in the liquid container based on the information related to the torque value, and a storage portion that stores height information related to the liquid container, and the processor controls the robot arm to move the tool downward from an upper end of the liquid container as a starting point and the processor calculates a moving distance of the robot arm based on a first position and a second position, the first position corresponds to an end of the robot end identified based on a lower end of the tool disposed at an upper end of the liquid container and the second position corresponds to the end of the robot arm, identified when the first torque value is measured and calculates a liquid level value based on the moving distance of the robot arm and the height of the liquid container, and the first torque value is measured based on the lower end of the moving tool contacting the surface of the liquid.

Further, according to an embodiment of the present disclosure, a method for calculating a liquid level, by a robot, can include driving, by a processor, the robot arm to move a tool disposed at an end of the robot arm downward inside of a liquid container, measuring, by the torque sensor, a first torque value with respect to a first impulse generated when the tool contacts the surface of the liquid, measuring, by the torque sensor, a second torque value with respect to a second impulse generated when a lower end of the tool contacts a bottom of the liquid container, and calculating, by the processor, the liquid level value based on first information related to the first torque and second information related to the second toque value.

According to the present disclosure, the robot can accurately measure the level of the liquid contained in the liquid container without using a water level sensor.

Effects of the present disclosure are not limited to the effects described above, and those skilled in the art of the present disclosure can easily understand various effects of the present disclosure based on the configuration of the present disclosure.

DETAILED DESCRIPTION OF EXEMPLARY IMPLEMENTATIONS

Hereinafter, the embodiments of the present disclosure will be described in detail with reference to the drawings so that those skilled in the art to which the present disclosure pertains can easily implement the present disclosure. The present disclosure can be implemented in many different manners and is not limited to the embodiments described herein.

In order to clearly illustrate the present disclosure, technical explanation that is not directly related to the present disclosure can be omitted, and same or similar components are denoted by a same reference numeral throughout the disclosure. Further, some embodiments of the present disclosure will be described in detail with reference to the exemplary drawings. In adding reference numerals to components of each drawing, the same components can have the same reference numeral as possible even if they are displayed on different drawings. Further, in describing the present disclosure, a detailed description of related known configurations and functions will be omitted when it is determined that it can obscure the gist of the present disclosure.

In describing components of the present disclosure, it is possible to use the terms such as first, second, A, B, (a), (b), and the like. These terms are only intended to distinguish a component from another component and a nature, an order, a sequence or the number of the corresponding components are not limited by that term. When a component is described as being "connected", "coupled", or "connected" to another component, the component can be directly connected or able to be connected to the other component; however, it is also to be understood that an additional component can be "interposed" between the two components, or the two components can be "connected", "coupled" or "connected" through an additional component.

Unless otherwise stated, each component can be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or can include additional components or steps.

Further, with respect to implementation of the present disclosure, the present disclosure can be described by subdividing an individual component; however, the components of the disclosure can be implemented within a device or a module, or a component of the present disclosure can be implemented by being divided into a plurality of devices or modules.

Hereinafter, in the present disclosure, the robot performs a particular function and travels in a particular area. The functions performed by the robot include various types of functions that can be provided by mobile devices, such as functions such as cleaning, performing methods, guidance, map drawing, and security functions.

Meanwhile, the robot described herein can automatically process work or can operate based on abilities of the robot. In particular, a robot that recognizes an environment and determines the state by itself, and operates operation of the robot can be referred to as "an intelligent robot".

Robots can be classified into industrial robots, medical robots, household robots, military robots, and the like, according to purposes or fields of use.

The robot can include a driver and the driver includes an actuator or a motor, to perform various kinds of physical operation such as moving a robot joint. Further, the driver of the movable robot includes a wheel, a brake, a propeller, and the like, and the robot can travel on the ground or can fly in the air using the driver.

Further, artificial intelligence (AI) technology can be used for the robot, and the AI technology can be implemented with a guide robot, a transport robot, a cleaning robot, a wearable robot, an entertainment robot, a pet robot, an unmanned flying robot, and the like.

The robot can include a robot controller that controls operation of the robot, and the robot controller can include software or hardware, for example, a chip.

The robot uses sensor information obtained from various types of sensors to obtain state information related to the robot or detect (recognize) the surrounding environment and objects or generate map data or determine a moving path and travel plans of the robot or determine response to user interaction, or determine operation of the robot.

The robot can use sensor information obtained from at least one sensor among a lidar, a radar, and a camera to determine a moving path and travel plans of the robot.

The robot can perform the above-mentioned operations using a learning model including at least one artificial neural network. For example, the robot can recognize the surrounding environment and the objects using the learning model and can determine the operation based on the recognized surrounding environment information or object information. The learning model can be learned directly by the robot or learned by an external device such as an AI server.

In this case, the robot can perform operation of the robot by generating a result using the learning model directly, but can transmit the sensor information to the external device such as the AI server and can receive the result generated based on the sensor information to perform the operation of the robot.

The robot determines a moving path and moving plans of the robot based on at least one of map data, object information detected based on sensor information, or object information obtained from the external device, and controls the driver to move the robot along the determined moving path or according to moving plans.

The map data can include object identification information related to various types of objects disposed in the space where the robot moves. For example, the map data can include object identification information related to fixed objects such as walls and doors and movable objects such as flowerpots and desks. The object identification information can include the name of robot, types of robot, distance between the robot and the object, position of the robot, and the like.

Further, the robot can perform operation or can move by controlling the driver based on the control/interaction of the user. In this case, the robot can obtain intention information related to the interaction based on operation of the user or a voice signal and can determine the response based on the obtained intention information to perform the operation of the robot.

Figure 1:
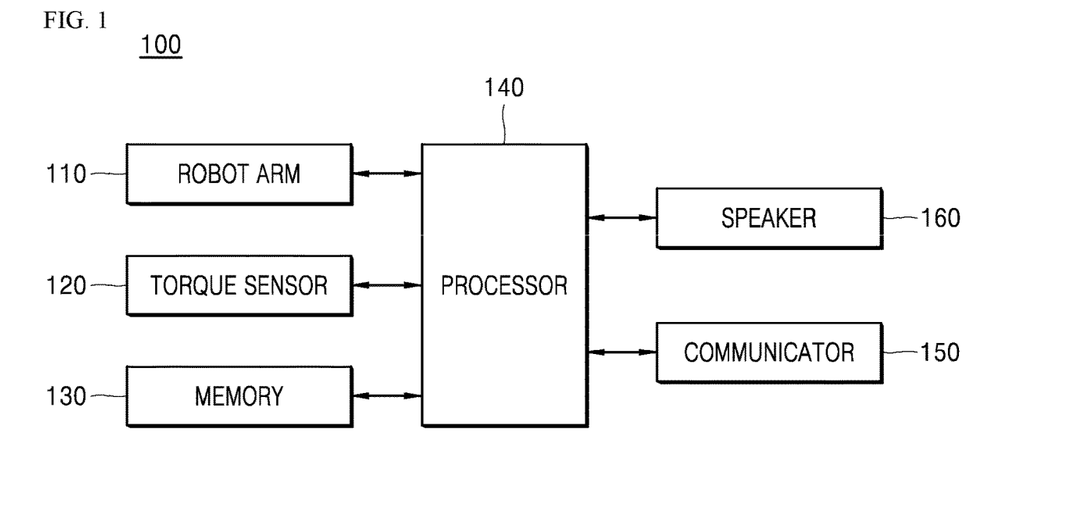
FIG. 1 shows a schematic configuration of a robot according to an embodiment of the present disclosure.

FIG. 1 shows a schematic configuration of a robot according to an embodiment of the present disclosure.

According to an embodiment of the present disclosure, a robot 100 can be a cooking robot that performs operation related to cooking. In particular, the robot 100 calculates a level value of a liquid contained in a liquid container, and performs operation of putting the liquid into a container using a scoop. To this end, the robot 100 includes a robot arm 110, a torque sensor 120, a memory 130, a processor 140, a memory 130, a communicator 150, and a speaker 160.

Meanwhile, the present disclosure is not limited to a cooking robot that uses a scoop, and the present disclosure can be applied to all types of tools including a scoop.

The robot arm 110 can include a plurality of robot joints and can perform various kinds of operation, for example, moving the robot joints.

As mentioned above, the robot arm 110 can perform operation of putting the liquid contained in the liquid container into a bowl. The liquid can include broth, soup, and the like.

The torque sensor 120 is also referred to as "a torque gauge" and measures the torque value of the driven robot arm 110.

The memory 130 can include volatile memory and/or nonvolatile memory and stores instructions or data related to at least one of components of the robot 100.

The processor 116 can include one or more of a central processing unit, an application processor, or a communication processor. For example, the processor 140 can execute operations or data processing related to the control and/or communication of at least one of components of the robot 110. In particular, the processor 116 can execute instructions related to the driving of the robot arm 110.

The processor 140 generates control instructions of the robot arm 110 and transmits the generated control instructions to the robot arm 110, and the robot arm 110 is driven according to the control instructions.

In particular, the processor 140 calculates a level value of the liquid contained in the liquid container 300. The configuration is described in more detail below.

Meanwhile, the memory 130 stores additional information used to calculate a liquid level value and further stores an artificial neural network-based algorithm model described below.

For example, the additional information can include size information (in particular, height information) related to the liquid container 300, size information (in particular, height information) related to the scoop 210, and can include various pieces of information.

The algorithm model can be learned. For example, the memory 130 can store an algorithm model learned by an external AI server. In another example, the memory 130 stores an algorithm model that is not learned, and learning can be performed through the processor 140.

The communicator 150 can transmit or receive data to and from a terminal device of a user who uses the AI server or the robot 100 using wired or wireless communication technology. For example, the communicator 110 can transmit and receive a learning model, a control signal, and the like, to and from external devices.

The communicator 150 can use a 5G network technology and can use global system for mobile communication (GSM), code division multi access (CDMA), long term evolution (LTE), wireless LAN (WLAN), wireless-fidelity (Wi-Fi), Bluetooth (Bluetooth™) Radio frequency identification (RFID), infrared communication (Infrared Data Association; IrDA), ZigBee, near field communication (NFC), and the like.

A speaker 160 outputs a particular voice signal.

Figure 2:
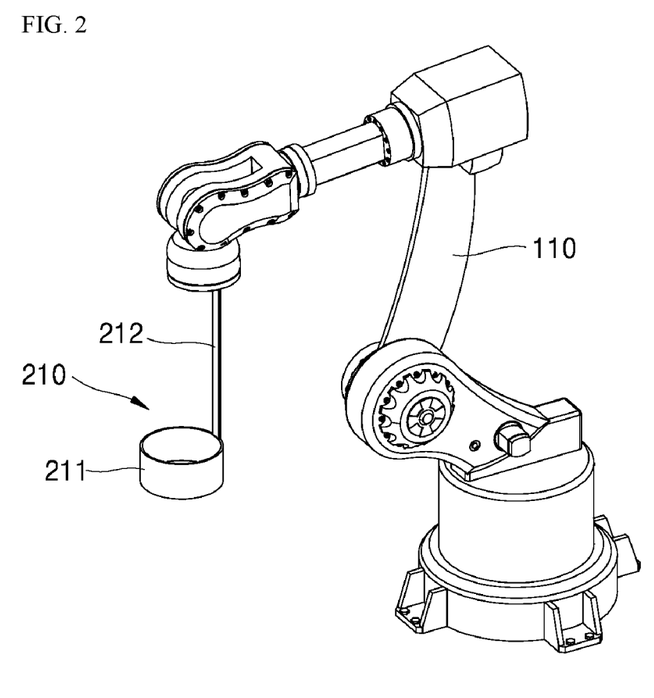
FIG. 2 shows a schematic shape of a robotic arm according to the present disclosure.

FIG. 2 shows a schematic shape of a robot arm 110 according to the present disclosure.

FIG. 2 shows a scoop 210 attached to an end of the robot arm 110.

The scoop 210 is used to transfer the liquid contained in the liquid container into a bowl and includes a container 211 and a handle 212.

The container 211 performs to contain the liquid and has a hemispherical shape. However, the present disclosure is not limited to the hemispherical shape and can have various types of shapes such as a cylindrical shape and a polyhedron shape. Further, a size (a length, a height, and a width) of the container 210 can vary.

The handle 212 is vertically coupled to the container 211. The handle 212 can be placed at the end of the robot arm 110.

Meanwhile, area information related to a bottom surface of the container 211, height information related to the container 211, and length information related to the handle 212 can be stored in the storage 150.

The torque sensor 120 can be attached to the robot arm 110. For example, the torque sensor 120 can be attached to the end of the robot arm 110 to which the scoop 210 is attached. However, the present disclosure is not limited thereto, and the torque sensor 120 can be attached to other joints of robot except for the end of the robot arm 110, and the lower surface of the container 211 of the scoop 210.

As mentioned above, the robot arm 110 moves the liquid contained in the liquid container to the bowl under the control of the processor 140. To this end, the robot arm 110 moves the scoop 210 into the liquid container.

Figure 3A:
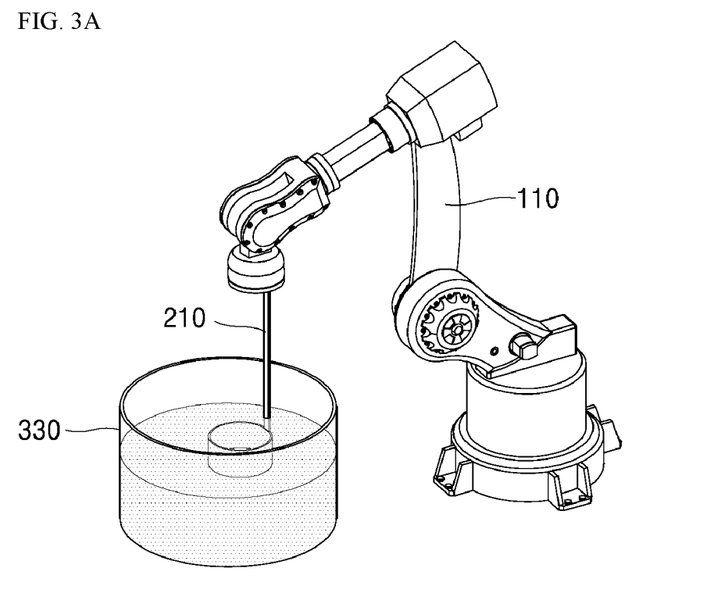
FIGS. 3A and 3B show operation concepts of robot arms according to an embodiment of the present disclosure.
Figure 3B:
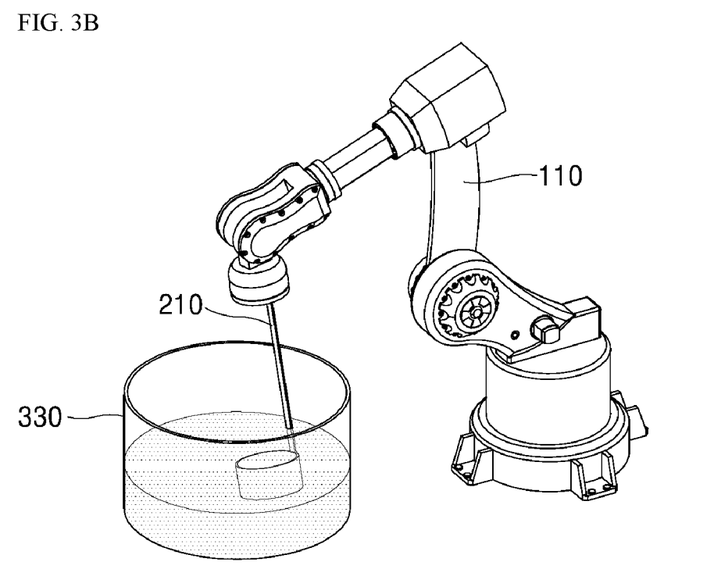

FIGS. 3A and 3B show operation concepts of robot arms 110 according to an embodiment of the present disclosure.

A robot arm 110 moves the scoop 210 downward inside of the liquid container 300 and moves the scoop 210 vertically with respect to the bottom surface of the liquid container 300 to contain the liquid in the container 211 of the scoop 210 and can perform operation of moving the scoop 210 containing the liquid upward the liquid container 300 and vertically with respect to the bottom surface of the liquid container 300 (FIG. 3A). This operation mode is referred to as "a vertical operation mode" for convenience. Meanwhile, vertical movement is a concept corresponding to "movement in a gravity direction".

Further, the robot arm 110 can perform operation of moving the scoop 210 downward inside the liquid container 300 and moving the scoop 210 vertically with respect to the bottom surface of the liquid container 300 to soak the scoop 210 into the liquid, and subsequently, obliquely moving the scoop 210 to contain the liquid in the container 211 of the scoop 210, and moving the scoop 210 containing the liquid upward the liquid container 300 and moving the scoop 210 vertically with respect to the bottom surface of the liquid container 300 (FIG. 3B). This operation mode is referred to as "a tilting operation mode" for convenience.

Operation of calculating, by the robot 100, the level value of liquid contained in the liquid container 300, that is, a method for calculating a liquid level value are described in detail below with reference to the following drawings.

Figure 4:
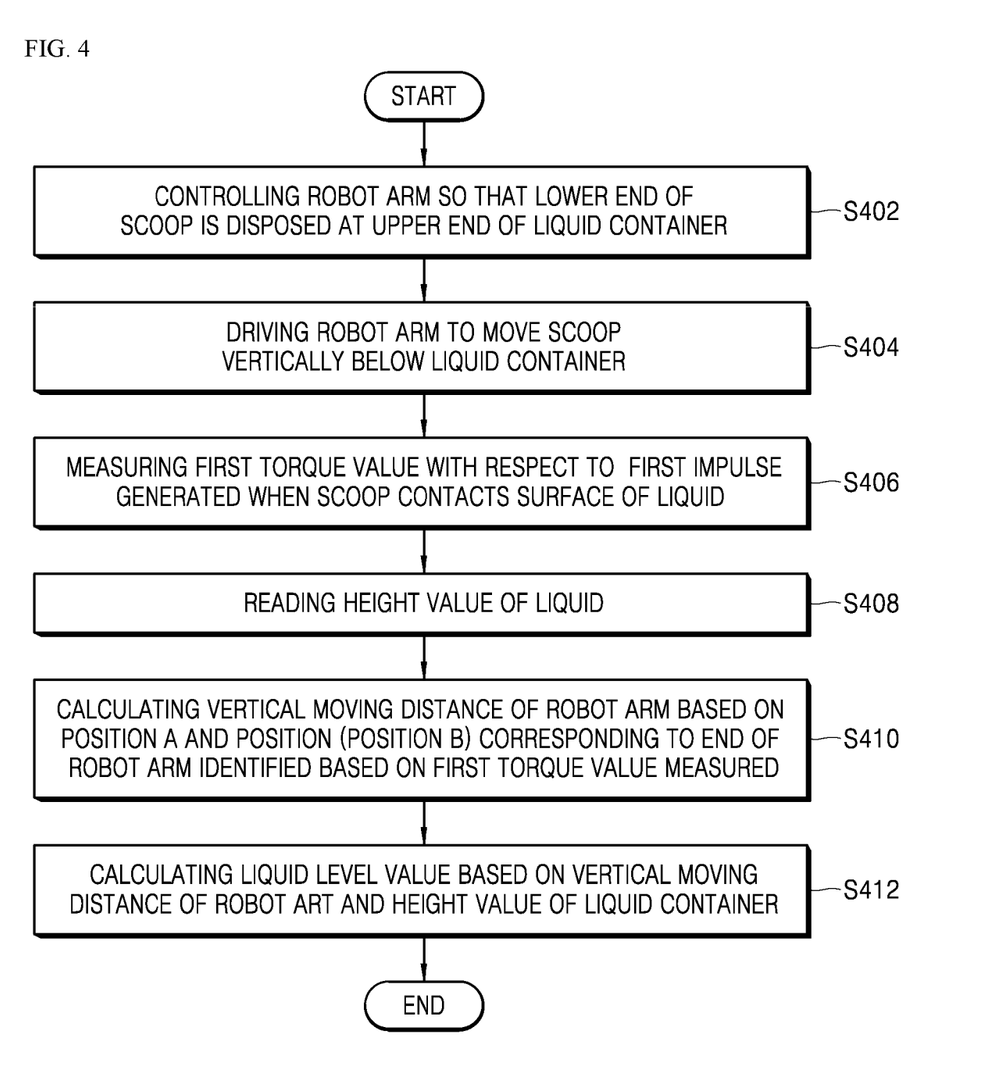
FIG. 4 is a flowchart showing a method for controlling a robot that calculates a liquid level value according to a first embodiment of the present disclosure.
Figure 5:
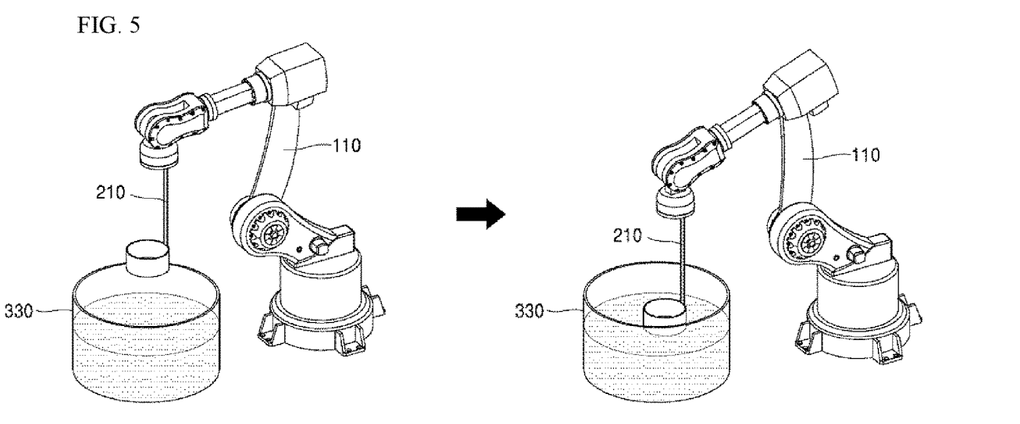
FIG. 5 shows a concept of operation of a robot through the method in FIG. 4.

FIG. 4 is a flowchart showing a method for controlling a robot 100 that calculates a liquid level value according to a first embodiment of the present disclosure. FIG. 5 shows a concept of operation of a robot 100 through the method in FIG. 4.

A process performed for each step is described in detail below.

First, a processor 140 controls a robot arm 110 so that a lower end of a scoop 210 is disposed at an upper end of a liquid container 300. This configuration corresponds to a figure shown on the left of FIG. 5.

That is, the processor 140 provides the end of the robot arm 110 in position A (S402). Position A corresponds to the end of the robot arm 110 identified based on the lower end of the scoop 210 disposed at the upper end of the liquid container 300. The lower end of the scoop 210 corresponds to a lower surface of the container 211 of the scoop 210. The position A can be calculated as a coordinate value and the like.

Subsequently, the torque sensor 120 drives the robot arm 110 so that the scoop 210 moves downward the liquid container 300 and moves vertically with respect to the bottom surface of the liquid container 300 (S404). In other words, the scoop 210 moves vertically downward from an upper end of the liquid container 300 as a starting point.

At this time, the processor 140 controls the robot arm 110 to move at a particular speed. For example, the robot arm 110 can be driven at a constant speed or at acceleration.

Subsequently, the torque sensor 130 measures a first torque value with respect to a first impulse generated when the scoop 210 vertically moves and contacts the surface of the liquid (S406). This configuration is the same as the picture shown on the right of FIG. 5.

In detail, a very less amount of impulse occurs when the scoop 210 vertically moves in the air. When the scoop 210 vertically moving in the air contacts the surface of the liquid, a relatively greater amount of impact (i.e., a first impulse) is generated, and the generated first impulse is transmitted to the robot art 110 through the handle 212 of the scoop 210. The torque sensor 120 outputs the transmitted first impulse as a torque value (e.g., a first torque value).

Meanwhile, as mentioned above, the scoop 210 can have various types of shapes. As an area of the lower surface of the container 210 becomes wider, sensitivity in measurement of the torque value can be improved.

Subsequently, the processor 140 reads a height value of the liquid container stored in the storage 150 (S408).

Subsequently, the processor 140 calculates a vertical moving distance of the robot arm 110 based on the position A and position B corresponding to the end of the robot arm 110 identified when the first torque value is measured (S410).

For example, the position B can also be calculated as a coordinate value, and the processor 140 can calculate the vertical moving distance of the robot arm 110 based on the height value corresponding to the position A (a z-axis value) and the height value corresponding to the position B (a z-axis value).

Finally, the processor 140 calculates the liquid level value based on the calculated vertical moving distance and the height value of the liquid container 300. For example, the processor 140 can calculate the liquid level value by subtracting the calculated vertical moving distance from the height value of the liquid container 300 (S412).

Figure 6:
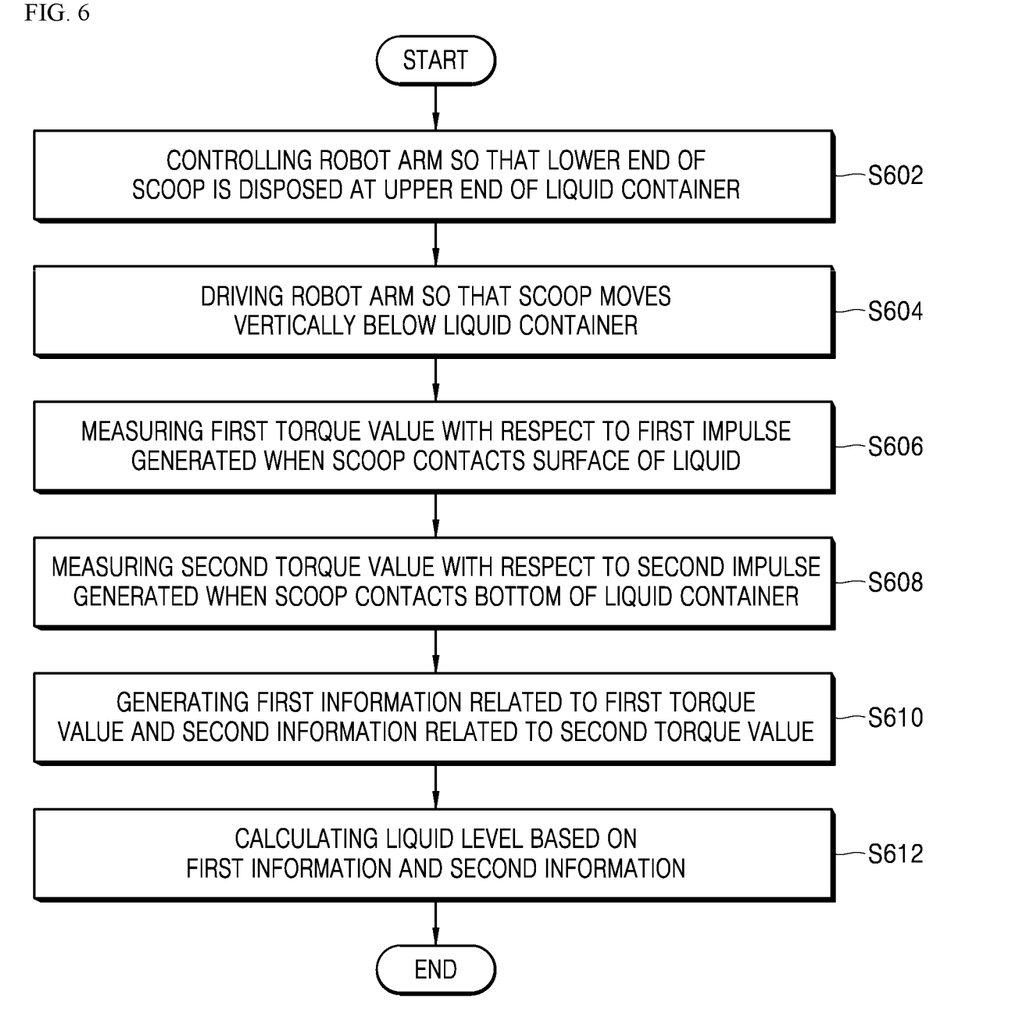
FIG. 6 is a flowchart showing a method for controlling a robot that calculates a liquid level value according to a second embodiment of the present disclosure.
Figure 7:
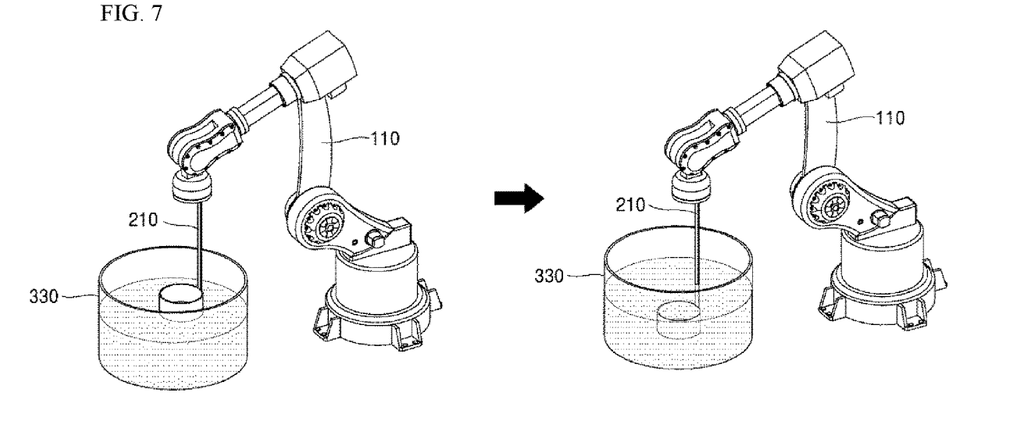
FIG. 7 shows a concept of operation of a robot through the method in FIG. 6.

FIG. 6 is a flowchart showing a method for controlling a robot 100 that calculates a liquid level value according to a second embodiment of the present disclosure. FIG. 7 shows operation of a robot 100 through the method in FIG. 6.

A process performed for each step is described in detail below.

First, a processor 140 controls a robot arm 110 so that a lower end of a scoop 210 is disposed at an upper end of a liquid container 300 (S602).

Subsequently, the processor 140 drives the robot arm 110 so that the scoop 210 moves vertically in the downward direction of the liquid container 300 (S604).

Subsequently, the torque sensor 120 measures a first torque value with respect to the first impulse generated when the scoop 210 moves vertically and contacts a surface of the liquid (S606). This configuration corresponds to the figure shown on the left of FIG. 7.

S602 to S606 are similar to S402 to S406 described above, and thus detailed description thereof is omitted. Meanwhile, the torque sensor 120 continually measures the torque value of the scoop 210 vertically moving in the liquid.

Further, the torque sensor 120 measures a second torque value with respect to second impulse generated when the scoop 210 contacts the bottom of the liquid container 300 (S608). This configuration corresponds to the figure shown on the right of FIG. 7.

In more detail, when the scoop 210 vertically moving inside the liquid contacts the bottom of the liquid container 300, a greater amount of impulse (e.g., second impulse) is generated, and the generated second impulse is transmitted to the robot arm 110 through the handle 212. The torque sensor 120 outputs the transmitted second impulse as the torque value (e.g., the second torque value).

Subsequently, the processor 140 generates first information related to the first torque value and second information related to the second torque value (S610).

Finally, the processor 140 calculates the level of the liquid based on the first information and the second information (S612).

According to one embodiment of the present disclosure, the first information can include the position of the end of the robot arm 110 identified when the first torque value is measured, and the second information can include the position of the end of the robot arm 110 identified when the second torque value is measured.

For example, the first information includes position B corresponding to the end of the robot arm 110 identified based on the scoop 210 contacting the liquid surface, and the second information includes position C corresponding to a position of the end of the robot arm 100 identified based on the scoop 210 contacting the bottom of the liquid container 300.

In this case, the processor 140 can calculate a difference between a height corresponding to the position B and a height corresponding to the position C, and calculate the height difference as the liquid level value.

That is, the processor 140 calculates the vertical moving distance of the robot arm 110 based on the height value (a z-axis value) of the position B and the height value (a z-axis value) of the position C, which are obtained as coordinate values and the vertical moving distance can be calculated as the liquid level value.

Further, according to another embodiment of the present disclosure, the first information can include a time point at which the first torque value is measured and the second information can include a time point at which the second torque value is measured.

That is, based on the torque value received from the torque sensor 120, the processor 140 can store a time point at which the torque value is received from the torque sensor 120, and the time point at which the torque value is received corresponds to a time point at which the torque value is measured.

In this case, the processor 140 can calculate the vertical moving distance of the robot arm 110 based on a vertical moving speed of the robot arm 110 used when the robot arm 110 is controlled, a difference between a time point at which the first torque value is measured and a time point at which the second torque value is measured, and can calculate the liquid level value based on the vertical moving distance.

Further, according to another embodiment of the present disclosure, the first information includes a first angle of joints of the robot arm 110 determined when the first torque value is measured, and the second information can include a second angle of joints of the robot arm 110 determined when the second torque value is measured.

In this case, the processor 140 calculates an angular velocity of the robot arm 110 based on the vertical movement speed of the robot arm 110, and calculates the vertical moving distance of the robot arm 100 based on the calculated angular velocity and a difference between the first angle and the second angle, and calculates the liquid level value based on the vertical moving distance.

In summary, the processor 140 calculates the vertical moving distance determined based on the scoop 210 moving from the surface of the liquid to the bottom of the liquid container 300 through various types of methods, and can calculate the liquid level value based on the calculated vertical moving distance.

Figure 8:
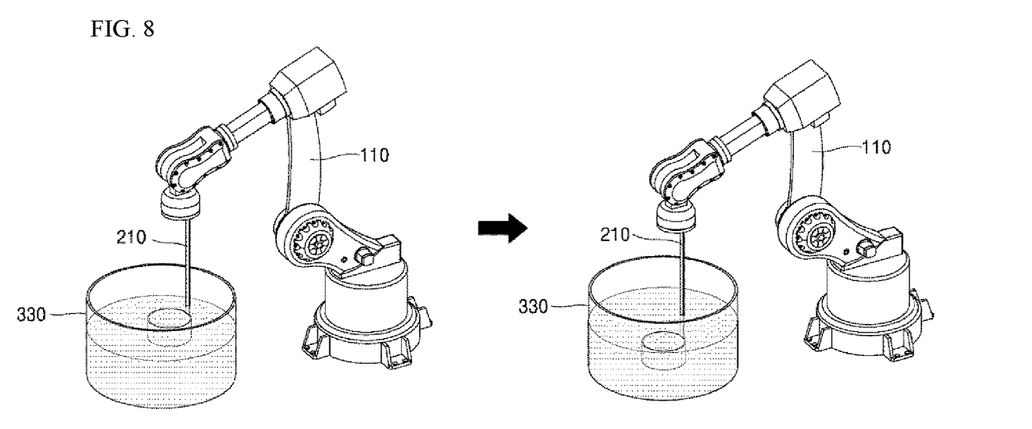
FIG. 8 shows a concept of operation of a robot that measures a liquid level value based on buoyancy according to an embodiment of the present disclosure.

Meanwhile, the processor 140 can additionally calculate a liquid level value based on a buoyancy value of the scoop 210.

The processor 140 determines the liquid level based on the liquid level determined based on the first information and the second information being identical to additionally calculated liquid level within an error range.

On the contrary, the processor 140 can perform the method in FIG. 5 described above again based on the liquid level determined based on the first information and the second information being different from an additionally calculated liquid level within an error range. More accurate measurement of liquid level can be performed.

According to an embodiment of the present disclosure, the processor 140 can calculate a first buoyancy value of the scoop 210 based on the end of the robot arm 210 being placed at position D, which is adjacent to position B in a downward direction of position B and calculates a second buoyancy value of the scoop 210 based on the end of the robot arm 210 provided at position C, and calculates the additional liquid level value based on a difference between the first buoyancy value and the second buoyancy value.

For example, the position D corresponding to the end of the robot arm 210 corresponds to the position of the end of the robot arm 210 identified based on an upper end of the container 211 of the scoop 210 contacting the surface of the liquid, in the liquid. Further, as described above, the position C corresponds to a position of the end of the robot arm 110 identified based on the scoop 210 contacting the bottom of the liquid container 300. This configuration is shown in FIG. 8.

Therefore, the processor 140 can measure the first buoyancy value of the scoop 210 based on the end of the robot arm 210 at the position D and can measure the second buoyancy value of the scoop 210 based on the end of the robot arm 210 at the position C, and calculate the liquid level value based on a difference between the second buoyancy value and the first buoyancy value. The buoyancy of the scoop 210 is inversely proportional to a height value of the scoop 210 with respect to the bottom of the liquid and the liquid level value can be calculated using the relation.

Further, according to another embodiment of the present disclosure, the processor 140 calculates the buoyancy value at the position of the scoop 210 based on position E of the end of the robot arm 210 with respect to the position of the scoop 210 put into the liquid and can calculate the additional liquid level value using the buoyancy value of the scoop 210 based on the end of the robot arm 210 at the position E and using an algorithm model.

That is, the torque sensor 120 can continually measure the torque value of the scoop 210 vertically moving, in the liquid, and the processor 140 can calculate the additional liquid level by inputting, to the algorithm model, the buoyancy value of the scoop 210 at one point of the liquid.

This configuration is described in more detail as follows.

Artificial intelligence refers to the field of researching artificial intelligence or a methodology that can produce the artificial intelligence, and machine learning refers to a field of defining various types of problems in the field of artificial intelligence and studying the methodology that resolves the problems. Machine learning is referred to as "an algorithm" that improves performance of work through consistent experience with respect to the work.

Artificial neural network (ANN) is a model used in machine learning, and can refer to a model including artificial neurons (nodes) to from network through coupling of synapses and performing a problem solving ability. The ANN can be determined based on connecting patterns between neurons of another layer, a learning process to update model parameters, an activation function to generate an output value.

The ANN can include an input layer, an output layer, and optionally one or more hidden layers. Each layer includes one or more neurons, and the ANN can include synapses that connect neuron to neuron. In the ANN, each neuron can output a function value of an active function for input signals, weights, and deflections input through the synapse.

The model parameter is determined through learning and includes weights of synaptic connections and deflection of neurons. Further, a hyper-parameter refers to a parameter to be set before learning in the machine learning algorithm, and includes a learning rate, the number of repetitions, a mini batch size, and an initialization function.

The ANN is learned to determine the model parameter to minimize a loss function. The loss function can be used as an index to determine an optimal model parameter during learning of the ANN.

Machine learning can be classified into supervised learning, unsupervised learning, and reinforcement learning.

The supervised learning can refer to a method of learning ANN based on a given label for training data, and a label can refer to a correct answer (or a result value) that can be inferred by the ANN based on the training data inputting to the ANN.

The unsupervised learning can refer to a method of training the ANN based on the label not provided for the learning data.

The reinforcement learning can refer to a method for learning actions to maximize, by an agent provided in any environment, accumulated compensation in each state and to select sequence of actions.

Machine learning, which is implemented with a deep neural network (DNN) including a plurality of hidden layers among the ANN is referred to as "deep learning" and the deep learning is a kind of machine learning. The machine learning is used to include the deep learning below.

Referring to the above, according to the present disclosure, an algorithm model based on the ANN that calculates a liquid level value includes an input layer, an output layer, and one or more hidden layers. The input layer includes input nodes, an output layer includes output nodes, and one or more hidden layers are disposed between the input layer and the output layer and include the hidden nodes.

At this time, the algorithm model is learned based on the learned data, and the weight of the edge and the bias of the node connecting nodes through the training can be updated. The training data can include a height value of the scoop 210 that is present at a point in the liquid, a torque value of the robot arm 210 with respect to the point, and a density of the liquid.

Then, the processor 140 calculates the buoyancy value of the scoop 210 with respect to the position E, based on the position E of the end portion of the robot arm 210 with respect to the position of the scoop 210 entering into the liquid.

Subsequently, the processor 140 inputs, to the input layer of the learned algorithm model, the buoyancy value of the scoop 210, the torque value determined based on the end of the robot arm at the position E, and the density of the liquid, and an additional liquid level value can be output to the output layer of the learned algorithm model.

Meanwhile, the processor 140 can control the robot arm 110 to operate in various types of operation modes based on the determined liquid level.

According to an embodiment of the present disclosure, the processor 140 can control the robot arm 110 to operate in the above-mentioned vertical operation mode based on the calculated liquid level value corresponding to a first level value greater than the height value of the container 211 of the scoop 210. The height value of the container 211 of the scoop 210 corresponds to a predetermined liquid level. This configuration is shown in FIG. 3A.

That is, the liquid can be fully contained in the container 211 of the scoop 210 based on the calculated liquid level value being the first level value. Thus, the processor 140 can operate the robot arm 110 in the vertical operation mode.

Further, according to another embodiment of the present disclosure, the processor 140 can control the robot arm 110 to operate in the above-mentioned tilting operation mode based on the calculated liquid level value being a second level value less than the height value of the container 211 of the scoop 210 and greater than a half of the height value of the container 211. This configuration is shown in FIG. 3B.

In other words, the liquid may not be fully contained in the container 211 of the scoop 210; rather an appropriate amount of liquid can be contained in the container 211 of the scoop 210 based on calculating the liquid level value being greater than the height value of the container 211 of the scoop 210. Thus, the processor 140 can operate the robot arm 110 in the tilting operation mode.

At this time, as the liquid contained in the liquid container 300 is completely removed so that the bottom can be seen, the processor 140 can transmit, to the user, the instructions to replenish the liquid.

That is, when the robot arm is driven in the tilting operation mode, the processor 140 generates a liquid replenishment message and controls the speaker 160 to output the generated liquid replenishment message, or can transmit the generated liquid replenishment message to a terminal device (e.g., a smart phone) of a manager.

Further, according to another embodiment of the present disclosure, the processor 140 can stop operation of the robot arm 110 and can control the speaker to output the message requiring liquid replenishment or can transmit the liquid replenishment message to the terminal apparatus of the manager based on the determined liquid level value being a third level value less than a half of the height value of the container 211 of the scoop 210.

In other words, the robot arm 110 may not contain the liquid using the scoop 210 based on the liquid level value being the third level value, the processor 140 can stop the operation of the robot arm 110 and can only transmit, to the user, instructions to replenish the liquid.

In summary, according to the present disclosure, the robot 100 can accurately measure the level of liquid contained in the liquid container without using a water level sensor.

Although components included in the embodiment of the present disclosure are described as being combined to one, or as being operated to operate, the present disclosure is not necessarily limited to such an embodiment, and these components can operate by being selectively combined to one or more within the purpose range of the present disclosure. Further, although all of the components can be implemented as an independent hardware, a part or all of each of the components can be selectively combined to be implemented as a computer program that has a program module that performs a part or all of the function combined in one or a plurality of hardware. The codes and the code segments that form the computer program will be easily deduced by those skilled in the art of the present disclosure. Such a computer program can be stored in a computer readable media that a computer can read, and can be read and implemented by the computer to implement the embodiment of the present disclosure. As the storage medium of the computer program, it can include a storage media including a semiconductor recording element, an optical recording media, and a magnetic recording media. Further, a computer program that implements the embodiment of the present disclosure can include a program module that is transmitted in real time via an external apparatus While the present disclosure has been described with reference to exemplary embodiments of the present disclosure, various modifications and changes can be made at a level of the skilled person in the art. Thus, unless the modifications and changes do not deviate from a scope of the present disclosure, it is to be understood that the modifications and changes are included in the scope of the present disclosure.

What is claimed is:

1. A robot, comprising:
   a robot arm having an end and configured to allow a tool to be attached to the end of the robot arm;
   a torque sensor disposed on the robot arm and configured to measure a torque value of the robot arm; and
   a processor configured to:
   control the robot arm to move the tool inside of a liquid container,
   receive the torque value from the torque sensor,
   calculate first information and second information related to the torque value, and
   calculate a first liquid level value of liquid contained in the liquid container based on the first information and the second related to the torque value, wherein the first information is related to a first torque value measured by the torque sensor when a lower end of the tool contacts a surface of the liquid, and the second information is related to a second torque value measured by the torque sensor when the lower end of the tool contacts a bottom surface of the liquid container.

2. The robot of claim 1, wherein an impulse is generated when the tool contacts the surface of the liquid or the tool moves in the liquid, and
wherein the impulse is transmitted to the robot arm along the tool, and the torque sensor measures the torque value based on the impulse.

3. The robot of claim 1, wherein
wherein the first information corresponds to a first position of the end of the robot arm when the first torque value is measured and the second information corresponds to a second position of the end of the robot arm when the second torque value is measured, and
wherein the processor is further configured to:
calculate a difference between a first height corresponding to the first position and a second height corresponding to the second position, and calculate the first liquid level value based on the difference between the first height and the second height.

4. The robot of claim 3, wherein the processor is further configured to:
calculate a first buoyancy value of the tool at a third position of the end of the robot arm, wherein the third position is adjacent to the first position in a downward direction,
calculate a second buoyancy value of the tool at the second position,
calculate a second liquid level value based on a difference between the first buoyancy value and the second buoyancy value, and
determine that the first liquid level value is correct when the first liquid level value is within an error range of the second liquid level value.

5. The robot of claim 1, wherein the processor is further configured to control the robot arm to move the tool vertically with respect to the bottom surface of the liquid container.

6. The robot of claim 5, wherein the first information corresponds to a first time point at which the first torque value is measured and the second information corresponds to a second time point at which the second torque value is measured, and
wherein the processor is configured to:
calculate a vertical moving distance of the robot arm based on a vertical movement speed of the robot arm moving vertically and a difference between the first time point and the second time point, and
calculate the vertical moving distance as the first liquid level value.

7. The robot of claim 5, wherein the first information corresponds to a first angle of a joint of the robot arm when the first torque value is measured and the second information corresponds to a second angle of a joint of the robot arm when the second torque value is measured, and
wherein the processor is configured to:
calculate a vertical moving distance of the robot arm based on a vertical moving speed of the robot arm and a difference between the first angle and the second angle, and
calculate the vertical moving distance as the first liquid level value.

8. The robot of claim 1, further comprising a memory that stores an algorithm model based on an artificial neural network,
wherein the processor is further configured to:
calculate a third buoyancy value of the tool with respect to a fourth position of the end of the robot arm when the tool enters into the liquid, and
calculate a third liquid level value based on the third buoyancy value of the tool and the algorithm model,
wherein the algorithm model comprises an input layer, an output layer, and one or more hidden layers,
wherein the input layer comprises input nodes,
wherein the output layer comprises output nodes,
wherein the one or more hidden layers are disposed between the input layer and the output layer and comprises hidden nodes, and
wherein weights of edges connecting nodes and bias of nodes are updated through learning.

9. The robot of claim 8, wherein the third buoyancy value of the tool, a fourth torque value calculated based on the end of the robot arm being at the fourth position, and a density of the liquid are input to the input layer of the learned algorithm model, and a fifth liquid level value is output to the output layer of the algorithm model.

10. The robot of claim 1, wherein the processor is further configured to control the robot arm to operate in a vertical operation mode based on the first liquid level value being greater than a predetermined liquid level, and
wherein, in the vertical operation mode, the robot moves the tool downward inside the liquid container, then moves the tool towards the bottom surface of the liquid container until the liquid enters a chamber of the tool, and then moves the tool containing the liquid vertically respect to the bottom surface of the liquid container.

11. The robot of claim 1, wherein the processor is further configured to control the robot arm to operate in a tilting operation mode based on the first liquid level value being less than the predetermined liquid level, and
wherein, in the tilting operation mode, the robot moves the tool downward inside the liquid container, then moves the tool towards the bottom surface of the liquid container until the liquid enters a chamber of the tool, then rotates the tool with respect to the container, and then moves the tool containing the liquid vertically with respect to the bottom surface of the liquid container.

12. The robot of claim 11, further comprising:
a speaker; and
a communicator,
wherein the processor is further configured to output, when the robot arm is driven in the tilting operation mode, a liquid replenishment message through the speaker, or transmit the liquid replenishment message, by the communicator, to a terminal apparatus.

13. The robot of claim 1, further comprising:
a speaker; and
a communicator,
wherein the processor is further configured to:
stop operation of the robot arm, based on the first liquid level value being less than half of a height value of a container of the tool, and
output a message requiring liquid replenishment through the speaker or transmit the liquid replenishment message, by the communicator, to a terminal apparatus.

14. A robot, comprising:
a robot arm having an end and configured to allow a tool to be attached to the end of the robot arm;
a torque sensor disposed on the robot arm and configured to measure a torque value of the robot arm;

a memory configured to store a height of a liquid container, a processor configured to:
control the robot arm to move the tool downward from a starting point, wherein the starting point is an upper end of the liquid container, receive a first torque value from the torque sensor, wherein the first torque value is measured when a lower end of the tool contacts a surface of liquid contained in the liquid container, calculate a moving distance of the robot arm based on a first position of the end of the robot arm and a second position of the end of the robot arm, wherein the first position corresponds a position of the end of the robot arm when a lower end of the tool is disposed at the upper end of the liquid container and the second position corresponds to a position of the end of the robot when the first torque value is measured, and calculate a liquid level value based on the moving distance and the height of the liquid container.

15. The robot of claim 14, wherein the processor is further configured to control the tool to move in a direction perpendicular to a bottom surface of the liquid container.

16. A method for calculating a liquid level, by a robot, the robot including a processor, a torque sensor, and a robot arm having an end, the end of the robot arm configured to be attached to a tool, the method comprising:

driving, by the processor, the robot arm to move the tool downward inside a liquid container;

measuring, by the torque sensor, a first torque value with respect to a first impulse generated when the tool contacts a surface of the liquid;

measuring, by the torque sensor, a second torque value with respect to a second impulse generated when a lower end of the tool contacts a bottom surface of the liquid container; and calculating, by the processor, a first liquid level value based on first information related to the first torque value and second information related to the second torque value.

17. The method for calculating the liquid level of claim 16, wherein the first impulse and second impulse are transmitted to the robot arm along the tool.

18. The method for calculating the liquid level of claim 16, wherein the first information corresponds to a first position of the end of the robot arm when the first torque value is measured and the second information corresponds to a second position of the end of the robot arm when the second torque value is measured, and wherein calculating the first liquid level value comprises:
calculating a difference between a first height of the end of the robot arm in the first position and a second height of the end of the robot arm in the second position, and calculating the first liquid level value based on the difference between the height corresponding to the first position and the height corresponding to the second position.

19. The method for calculating the liquid level of claim 18, further comprising:

calculating, by the processor, a first buoyancy value of the tool at a third position of the end of the robot arm, wherein the third position is adjacent to the first position in a downward direction;

calculating, by the processor, a second buoyancy value of the tool at the second position;

calculating, by the processor, a second liquid level value based on a difference between the first buoyancy value and the second buoyancy value; and determining, by the processor, that the first liquid level value is correct when the first liquid level value is within an error range of the second liquid level value.

20. The method for calculating the liquid level of claim 16, further comprising:

calculating, by the processor, a buoyancy value of the tool with respect to a fourth position of the end of the robot arm when the tool enters into the liquid; and calculating, by the processor, a third liquid level value based on the buoyancy value of the tool and an algorithm model, the algorithm model being based on an artificial neural network, wherein the algorithm model comprises an input layer, an output layer, and one or more hidden layers, wherein the input layer comprises input nodes, wherein the output layer comprises output nodes, wherein the one or more hidden layers are disposed between the input layer and the output layer and comprise hidden nodes, and wherein weights of nodes connecting nodes and bias of nodes are updated through learning.

* * * * *